(12) United States Patent
Liu et al.

(10) Patent No.: US 12,215,279 B2
(45) Date of Patent: Feb. 4, 2025

(54) COMPOSITION FOR EXPLOITING NATURAL GAS HYDRATES AND APPLICATION METHOD THEREOF

(71) Applicants: Nankai University, Tianjin (CN); Guangzhou Marine Geological Survey, Guangzhou (CN); Institute of Exploration Technology, Chinese Academy of Geological Sciences, Langfang (CN)

(72) Inventors: Xiaohang Liu, Tianjin (CN); Annan Guo, Cangzhou (CN); Peng Zhao, Tianjin (CN); Xiaoyang Li, Langfang (CN); Jinqiang Liang, Guangzhou (CN); Wei Huang, Guangzhou (CN); Yongqin Zhang, Langfang (CN)

(73) Assignee: Nankai University, Tianjin (CN)

( * ) Notice: Subject to any disclaimer, the term of this patent is extended or adjusted under 35 U.S.C. 154(b) by 0 days.

(21) Appl. No.: 18/357,077

(22) Filed: Jul. 21, 2023

(65) Prior Publication Data

US 2023/0357628 A1    Nov. 9, 2023

Related U.S. Application Data

(62) Division of application No. 18/145,133, filed on Dec. 22, 2022, now Pat. No. 11,760,923.

(30) Foreign Application Priority Data

Jan. 7, 2022    (CN) .......................... 202210017030.8

(51) Int. Cl.
   *C09K 8/80*    (2006.01)

(52) U.S. Cl.
   CPC ...................................... *C09K 8/80* (2013.01)

(58) Field of Classification Search
   CPC ......................................................... C09K 8/80
   See application file for complete search history.

(56) References Cited

U.S. PATENT DOCUMENTS 4,715,746 A * 12/1987 Mann ................... C09K 8/5086
                                                                507/926
4,761,099 A *  8/1988 Mann ..................... C09K 17/30
                                                                166/295

(Continued)

FOREIGN PATENT DOCUMENTS

CN        101056945 A      10/2007
CN        101691739 A       4/2010

(Continued)

OTHER PUBLICATIONS

Wang, Qiaoyi et al., "Research Status of Development and Modification of Polyurethane", Progress in Textile Science & Technology, Apr. 25, 2021, Full Text.

(Continued)

*Primary Examiner* — Alicia Bland

(57) ABSTRACT

A method for administering a composition for exploiting natural gas hydrates. The method includes the following steps: injecting the reagent A into the tube A; injecting the reagent B into the tube B; stretching the tube A and the tube B into a hydrate reservoir by using a reagent injection instrument; regulating a flow rate according to a proportion of each component; allowing the reagents to react at a preset reservoir position; and allowing water in the reservoir to participate in the reaction at the same time, wherein a reaction product is used for supporting the reservoir.

6 Claims, 1 Drawing Sheet

(56) References Cited

U.S. PATENT DOCUMENTS

| | | | | |
|---|---|---|---|---|
| 6,090,864 | A | * | 7/2000 | Narayan ............ C08G 18/6564 |
| | | | | 521/137 |
| 2013/0261200 | A1 | * | 10/2013 | Dorr .................... C08G 18/283 |
| | | | | 521/123 |
| 2014/0332213 | A1 | | 11/2014 | Zhou et al. |
| 2015/0252246 | A1 | | 9/2015 | Fossen et al. |
| 2018/0327657 | A1 | | 11/2018 | Pitchumani et al. |
| 2018/0370125 | A1 | | 12/2018 | Rolland et al. |
| 2019/0218330 | A1 | * | 7/2019 | Suetterlin .......... C08G 18/4833 |

FOREIGN PATENT DOCUMENTS

| | | | |
|---|---|---|---|
| CN | 101798376 | A | 8/2010 |
| CN | 102010498 | A | 4/2011 |
| CN | 105859963 | A | 8/2016 |
| CN | 108374437 | A | 8/2018 |
| CN | 111945446 | A | 11/2020 |
| CN | 111961162 | A * | 11/2020 ......... C08F 283/006 |
| CN | 112185469 | A | 1/2021 |
| CN | 112759735 | A | 5/2021 |
| WO | 2020048040 | A1 | 3/2020 |

OTHER PUBLICATIONS

Jia, Chao et al., "Comparison of Protective Properties of Methyl Triethoxy Silicone Resin Modified by Nano-SiO2 and FEVE Fluorocarbon Resin", Shandong Land and Resources, Apr. 15, 2019, Full Text.

Liu, Zhi, "The Preparation and Properties of Polyurethane Materials for Sealing and Filing in Coal Mine", China Master's Theses Full-Text Database Engineering Science and Technology Series I, Jun. 15, 2013, Full Text.

Zhao, Hongren et al., "A polyurethane adhesive/sealant composition and its preparation method", AOBO Adheive Chemical Co., Ltd., Jul. 16, 1998, Full Text.

* cited by examiner

COMPOSITION FOR EXPLOITING NATURAL GAS HYDRATES AND APPLICATION METHOD THEREOF

CROSS-REFERENCE TO RELATED APPLICATIONS

The present application is a continuation of U.S. application Ser. No. 18/145,133, filed on Dec. 22, 2022, entitled "REAGENT FOR EXPLOITING NATURAL GAS HYDRATES AND APPLICATION METHOD THEREOF" and which is incorporated herein by reference and for all purposes.

TECHNICAL FIELD

The present disclosure belongs to the field of novel materials, and relates to an exploitation technology of natural gas hydrates, in particular to a composition for exploiting natural gas hydrates and an application method thereof.

BACKGROUND OF THE PRESENT DISCLOSURE

Natural gas hydrates, commonly known as "combustible ice", are crystalline compounds formed by alkane gas mainly including methane, and water molecules at low temperature and high pressure; and the natural gas hydrates are widely distributed in seabed deposits and land permafrost zones, and have the characteristics of large reserves and no pollution, which are likely to change an existing energy structure in the world. It is well-known that China is "rich in coal, poor in oil and short of gas". Therefore, the commercial and efficient exploitation of natural gas hydrates not only can assist the implementation of a "carbon neutrality" plan, but also can ensure the security of the natural energy, and effectively alleviate the tense energy situation. According to relevant reports, the reserve of the natural gas hydrates in the South China Sea alone is as high as $8.8*10^{13}$ cubic meters, which is more than enough to satisfy the energy demand of China for 200 years.

At present, the exploitation methods mainly include a depressurization method, a heat injection method, a $CO_2$ replacement method, a chemical inhibitor injection method, a solid fluidization method, etc., all of which have obvious defects. 1. The depressurization method is easy to cause excessively low temperature of the reservoir, causing icing or secondary generation of the natural gas hydrates, and further leading to the blockage of a permeation path. 2. The heat injection method is limited by heat conductivity of seabed rocks and interstitial fluid, so that an energy conduction range is limited, and the energy consumption is very high. 3. The $CO_2$ replacement method requires harsh environmental conditions and has limited replacement efficiency, and $CO_2$ easily permeates into an exploitation well in a replacement process, bringing new separation problems. 4. The chemical inhibitor injection method brings some adverse effects to underground water and marine ecological environment, and the cost of chemical inhibitors is relatively high, so that the economical efficiency is even worse. 5. The solid fluidization method has relatively low exploitation efficiency for diagenetic combustible ice.

More importantly, the above methods cannot well protect strata and reservoirs; and stratum subsidence, submarine landslide and reservoir collapse often occur in the exploitation process.

Existing reagents are all used as inhibitors for decomposition of natural hydrates. The inhibition reagents are harsh in application conditions, low in reaction rate, poor in economic efficiency and high in environmental risk.

At present, there is no reagent that not only increases the exploitation efficiency of the hydrates, but also solves the problems such as reservoir collapse, etc.

SUMMARY OF PRESENT DISCLOSURE

A purpose of the present disclosure is to overcome the disadvantages of the prior art, and provide a reagent for exploiting natural gas hydrates and an application method thereof, so as to not only improve the exploitation efficiency of the hydrates, but also solve the problems such as reservoir collapse, etc.

The technical solution adopted by the present disclosure to solve the technical problems is as follows:

A composition for exploiting natural gas hydrates includes a reagent A and a reagent B.

The reagent A is PEG400-polyurethane prepolymer;

The reagent B includes PEG400 and an initiator;

A volume ratio of the PEG400-polyurethane prepolymer, the PEG400 and the initiator is (1-3000):(1-1000):(1-2000), preferably (1-800):(1-400):(1-600), more preferably (1-60):(1-20):(1-40), and further preferably (1-5):(1-2):(1-4).

The PEG400-polyurethane prepolymer and the PEG400 are skeleton structures of a reaction product.

The initiator includes components by mass percentage as follows:

water: 50-55 wt % triethanolamine: 5-10 wt % triethylene diamine: 5-10 wt %

1, 4-butanediol: 20-30 wt % methanol: 5-15 wt %.

The water is used as a foaming agent; the triethanolamine and the triethylene diamine are used as chain extenders of the reaction; and 1, 4-butanediol and methanol are used as cross-linking agents of the reaction product.

A preparation method of the PEG400-polyurethane prepolymer includes: mixing PEG400 and cyclohexanone which are separately dehydrated; stirring in an inert protective atmosphere under an acid condition; dropwise adding diphenyl methane diisocyanate; and after the dropwise addition, increasing the temperature to 40-70° C., and carrying out a reaction for 2-4 hours to obtain the PEG400-polyurethane prepolymer. A mass ratio of PEG400, cyclohexanone and diphenyl methane diisocyanate is (1-880):(1-1300):(1-1600), further preferably (1-70):(1-120):(1-160), and more preferably (1-4):(2-7):(1-10).

The reagent A is injected into a tube A; the reagent B is injected into a tube B; the tube A and the tube B are stretched by a reagent injection instrument into a hydrate reservoir; the reagents in the tube A and the tube B are both liquid with fluidity; and a flow rate is regulated according to a proportion of each component, so that the whole group of reagents begin to react at a predetermined place. The PEG400-polyurethane prepolymer, the PEG400 and the initiator are mixed, and then foamed and cross-linked, and an obtained product has excellent pressure resistance and supporting performance.

The natural gas hydrates exist in the reservoir in a solid form; and in the exploitation process, the natural gas hydrates become liquid water and gaseous natural gas, which leads to that no solid supports the reservoir in a mining area, and further easily causes the reservoir collapse phenomenon. A final product of the composition of the present disclosure is a novel polyurethane reservoir reconstruction material, which is a solid gummy material with certain supporting force and pressure resistance; and after the natural gas hydrates are exploited, an original occupied space is occupied by the novel polyurethane reservoir reconstruction material, thereby ensuring that the reservoir is not easy to collapse.

The foaming and cross-linking of the reagent require "water" to participate in the reaction; and the "water" in some natural gas hydrates may participate in the reaction to become a foaming agent and a diluting agent, thereby destroying the balance of the natural gas hydrate, so that the natural gas is easily separated out. In addition, the reaction is exothermic reaction; the decomposition of the natural gas hydrates needs heat; and the heat released by the reaction may further promote the decomposition, so that the regeneration of the natural gas hydrates in a high-pressure low-temperature pipeline can be avoided effectively.

Controlling the content of water in the initiator is mainly to control chemical conditions and reaction rate when the reaction occurs; and after the reaction begins, due to the influence of temperature rise, the "water" in some natural gas hydrates participates in the reaction, which is not only used as the foaming agent, but also serves as the diluting agent to dilute a reaction system, so that the reaction rate is reduced.

The present disclosure has the advantages and beneficial effects:

The environment-friendly composition developed by the present disclosure has excellent performance and high stability, and can effectively "replace" the "water" of the natural gas hydrate. Moreover, the reaction is exothermic reaction to effectively increase the reaction rate, which reduces the energy loss on the one hand, and reduces the blockage of a gas passage caused by the secondary generation of the natural gas hydrates in a low-temperature high-pressure pipeline during transferring on the other hand. A reaction product of the reagent is a novel high molecular material, which is ultra-stable at seabed, thereby not only improving the seabed environment, but also avoiding the stratum subsidence, reservoir collapse, submarine landslide and other environmental disaster accidents and instability of well walls in the exploitation process.

DETAILED DESCRIPTION OF PREFERRED EMBODIMENTS

The present disclosure is further described in detail below through specific embodiments. The following embodiments are only descriptive rather than limiting, and shall not be used to limit the protection scope of the present disclosure.

Embodiment 1

A composition for exploiting natural gas hydrates is composed of PEG400-polyurethane prepolymer, PEG400 and an initiator, and a volume ratio of the components is 3:2:2.

A preparation method of the PEG400-polyurethane prepolymer includes the following steps:

S1, 20 g of polyethylene glycol 400 (PEG400) is dehydrated;

S2, 50 g of cyclohexanone is dehydrated for 24 hours;

S3, the dehydrated PEG400 and cyclohexanone are mixed, and stirred in an inert protective atmosphere under an acid condition (pH is regulated to 2-6 with phosphoric acid); 45 g of diphenyl methane diisocyanate is dropwise added; and after the dropwise addition, the temperature increases to 60° C., and the reaction is carried out for 2 hours to obtain the PEG400-polyurethane prepolymer.

A preparation method of the initiator: 10 g (52.63 wt %) of water, 1 g (5.26 wt %) of triethanolamine, 1 g (5.26 wt %) of triethylene diamine, 5 g (26.32 wt %) of 1, 4-butanediol and 2 g (10.53 wt %) of methanol are mixed at room temperature to obtain the initiator.

Figure 1:
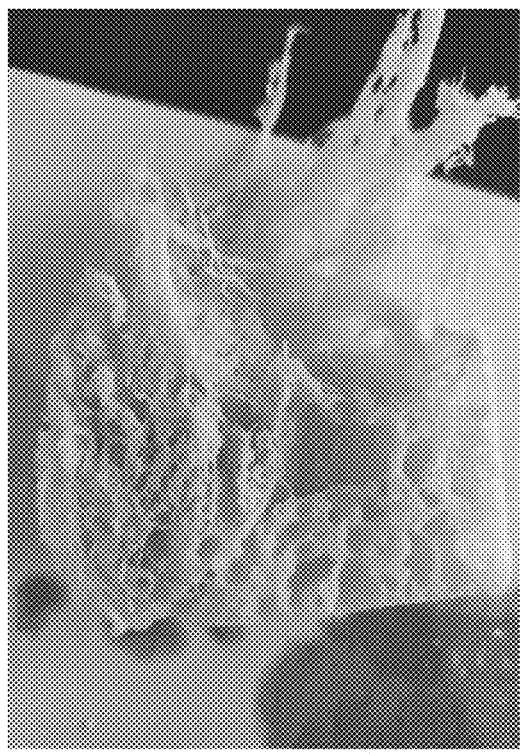
FIG. 1 is a sectional view of a product obtained after foaming and cross-linking in embodiment 1.
Figure 2:
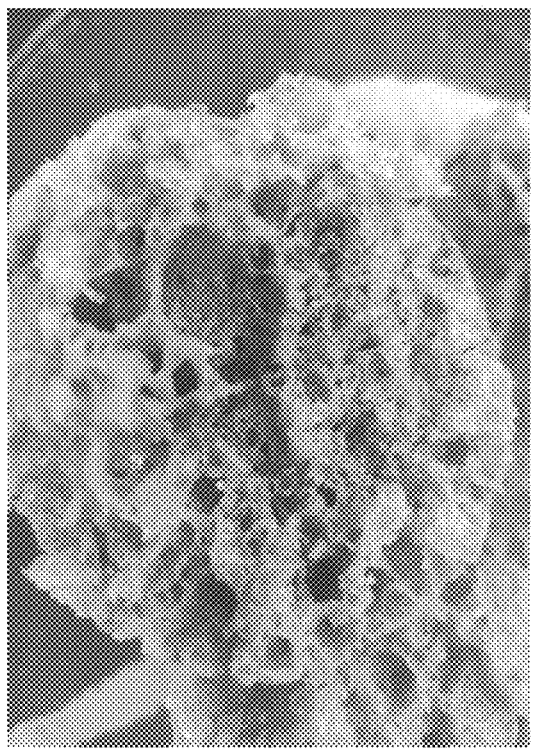
FIG. 2 is a sectional view of a product obtained after foaming and cross-linking under sediment conditions.

The PEG400-polyurethane prepolymer prepared above is foamed and cross-linked with the PEG400 and the initiator at room temperature to obtain a product as shown in FIG. 1. An HPB-type digital pull and push dynamometer produced by Yueqing Handpi Instruments Co., Ltd, and a sample with a height of 2 cm are used; and the bearing pressure of the product is 107 N when being compressed by 25%, which proves that the product has excellent pressure resistance. As shown in FIG. 2, under a sediment condition, the reagent can still be foamed and polymerized normally and has a through-hole structure, which ensures the smooth escape of the natural gas.

Embodiment 2

Different from embodiment 1, the volume ratio of the PEG400-polyurethane prepolymer, the PEG400 and the initiator is 5:2:2.

Embodiment 3

Different from embodiment 1, the volume ratio of the PEG400-polyurethane prepolymer, the PEG400 and the initiator is 4:2:3.

Comparative Example 1

Different from embodiment 1, the volume ratio of the PEG400-polyurethane prepolymer, the PEG400 and the initiator is 1:1:1.

Comparative Example 2

Different from embodiment 1, the volume ratio of the PEG400-polyurethane prepolymer, the PEG400 and the initiator is 2:5:5.

TABLE 1

| Volume ratio of components and material performance | Embodiment 1 | Embodiment 2 | Embodiment 3 | Comparative example 1 | Comparative example 2 |
|---|---|---|---|---|---|
| PEG400-polyurethane prepolymer | 3 | 5 | 4 | 1 | 2 |
| PEG400 | 2 | 2 | 2 | 1 | 5 |
| Initiator | 2 | 2 | 3 | 1 | 5 |
| Bearing pressure | 107N | 191N | 166N | 90N | 0N |

It may be seen from data in Table 1 that when the volume ratio of the PEG400-polyurethane prepolymer, the PEG400 and the initiator is controlled in a range of (1-5):(1-2):(1-4), the bearing pressure is highest.

Embodiment 4

Different from embodiment 1, the mass percentage of the initiator is as follows: 50 wt % of water, 5 wt % of triethanolamine, 5 wt % of triethylene diamine, 30 wt % of 1, 4-butanediol and 10 wt % of methanol.

Embodiment 5

Different from embodiment 1, the mass percentage of the initiator is as follows: 50 wt % of water, 5 wt % of triethanolamine, 5 wt % of triethylene diamine, 25 wt % of 1, 4-butanediol and 15 wt % of methanol.

Embodiment 6

Different from embodiment 1, the mass percentage of the initiator is as follows: 55 wt % of water, 5 wt % of triethanolamine, 5 wt % of triethylene diamine, 25 wt % of 1, 4-butanediol and 10 wt % of methanol.

Comparative Example 3

Different from embodiment 1, the mass percentage of the initiator is as follows: 70 wt % of water, 5 wt % of triethanolamine, 5 wt % of triethylene diamine, 15 wt % of 1, 4-butanediol and 5 wt % of methanol.

Comparative Example 4

Different from embodiment 1, the mass percentage of the initiator is as follows: 59 wt % of water, 6 wt % of triethanolamine, 6 wt % of triethylene diamine and 29 wt % of 1, 4-butanediol.

TABLE 2

| Content of initiator components and material performance | Embodiment 4 | Embodiment 5 | Embodiment 6 | Comparative example 3 | Comparative example 4 |
|---|---|---|---|---|---|
| Water | 50% | 50% | 55% | 70% | 59% |
| Triethanolamine | 5% | 5% | 5% | 5% | 6% |
| Triethylene diamine | 5% | 5% | 5% | 5% | 6% |
| 1,4-butanediol | 30% | 25% | 25% | 15% | 29% |
| Methanol | 10% | 15% | 10% | 5% | 0 |
| Bearing pressure | 104N | 106N | 107N | 75N | 69N |

It may be seen from data in Table 2 that when the content of the initiator components is in a preferred range, the bearing pressure is highest.

The above only describes preferred embodiments of the present disclosure. It should be pointed out that several transformations and improvements may be made by those ordinary skilled in the art without departing from the concept of the present disclosure, and these transformations and improvements shall fall into the protection scope of the present disclosure.

We claim:
1. A method for administering a composition for exploiting natural gas hydrates, wherein the composition comprises a reagent A and a reagent B; the method comprises the following steps:
   injecting the reagent A into a tube A;
   injecting the reagent B into a tube B;
   stretching the tube A and the tube B into a hydrate reservoir by using a reagent injection instrument;
   regulating a flow rate according to a proportion of each component;
   allowing the reagents to react at a preset reservoir position; and
   allowing water in the reservoir to participate in the reaction at the same time, wherein a reaction product is used for supporting the reservoir;
   wherein the reagent A is PEG400-polyurethane prepolymer;
   the reagent B comprises PEG400 and an initiator; a volume ratio of the PEG400-polyurethane prepolymer, the PEG400 and the initiator is (1-3000):(1-1000):(1-2000);
   a preparation method of the PEG400-polyurethane prepolymer comprises: mixing PEG400 and cyclohexanone which are separately dehydrated; stirring in an inert protective atmosphere under an acid condition; dropwise adding diphenyl methane diisocyanate; after the dropwise addition, increasing the temperature to

40° C.-70° C., and carrying out a reaction for 2-4 hours to obtain the PEG400-polyurethane prepolymer, wherein a mass ratio of PEG400, cyclohexanone and diphenyl methane diisocyanate is (1-880):(1-1300):(1-1600);

the initiator comprises components by mass percentage:
water: 50-55 wt %,
triethanolamine: 5-10 wt %,
triethylene diamine: 5-10 wt %,
1, 4-butanediol: 20-30 wt %, and
methanol: 5-15 wt %.

2. The method according to claim 1, wherein the volume ratio of the PEG400-polyurethane prepolymer, the PEG400 in the reagent B and the initiator is (1-800):(1-400):(1-600).

3. The method according to claim 2, wherein the volume ratio of the PEG400-polyurethane prepolymer, the PEG400 in the reagent B and the initiator is (1-60):(1-20):(1-40).

4. The method according to claim 3, wherein the volume ratio of the PEG400-polyurethane prepolymer, the PEG400 in the reagent B and the initiator is (1-5):(1-2):(1-4).

5. The method according to claim 1, wherein the mass ratio of the PEG400, the cyclohexanone and the diphenyl methane diisocyanate is (1-70):(1-120):(1-160).

6. The method according to claim 5, wherein the mass ratio of the PEG400, the cyclohexanone and the diphenyl methane diisocyanate is (1-4):(2-7):(1-10).

* * * * *